(12) United States Patent
Crespi et al.

(10) Patent No.: US 9,152,409 B2
(45) Date of Patent: Oct. 6, 2015

(54) LOW OR MEDIUM VOLTAGE ELECTRIC POWER DISTRIBUTION NETWORK

(75) Inventors: Andrea Crespi, Gallarate (IT); Massimo Scarpellini, Dalmine (IT)

(73) Assignee: ABB Technology AG, Zurich (CH)

( * ) Notice: Subject to any disclaimer, the term of this patent is extended or adjusted under 35 U.S.C. 154(b) by 131 days.

(21) Appl. No.: 13/823,374

(22) PCT Filed: Aug. 17, 2011

(86) PCT No.: PCT/EP2011/064184
§ 371 (c)(1),
(2), (4) Date: Mar. 14, 2013

(87) PCT Pub. No.: WO2012/034816
PCT Pub. Date: Mar. 22, 2012

(65) Prior Publication Data
US 2013/0174139 A1  Jul. 4, 2013

(30) Foreign Application Priority Data

Sep. 15, 2010  (EP) ..................................... 10176966

(51) Int. Cl.
*G06F 9/445* (2006.01)
*G06F 11/14* (2006.01)

(52) U.S. Cl.
CPC .............. *G06F 8/65* (2013.01); *G06F 11/1433* (2013.01)

(58) Field of Classification Search
None
See application file for complete search history.

(56) References Cited

U.S. PATENT DOCUMENTS

| 2003/0009752 A1 | 1/2003 | Gupta |
| 2003/0226138 A1 | 12/2003 | Luu |
| 2004/0092255 A1 | 5/2004 | Ji et al. |
| 2005/0204353 A1* | 9/2005 | Ji .................................. 717/168 |

* cited by examiner

*Primary Examiner* — Chuck Kendall
(74) *Attorney, Agent, or Firm* — Novak Druce Connolly Bove + Quigg LLP

(57) ABSTRACT

A low or medium voltage electric power distribution network comprising at least a P&C device (IED1, IEDN), and a computer station 11 which communicate with said at least a P&C device through a communication network 12. Said computer station comprises first computerized means 111 for executing, according to a batch processing mode, downloading sessions of the software package (F1, FN) to said P&C devices in order to upgrade the software of said at least a P&C device, and said at least a P&C device comprises second computerized means 115 for executing a procedure for safely managing the software upgrade in said at least a P&C device.

18 Claims, 3 Drawing Sheets

LOW OR MEDIUM VOLTAGE ELECTRIC POWER DISTRIBUTION NETWORK

CROSS REFERENCE TO RELATED APPLICATIONS

Figure 1:
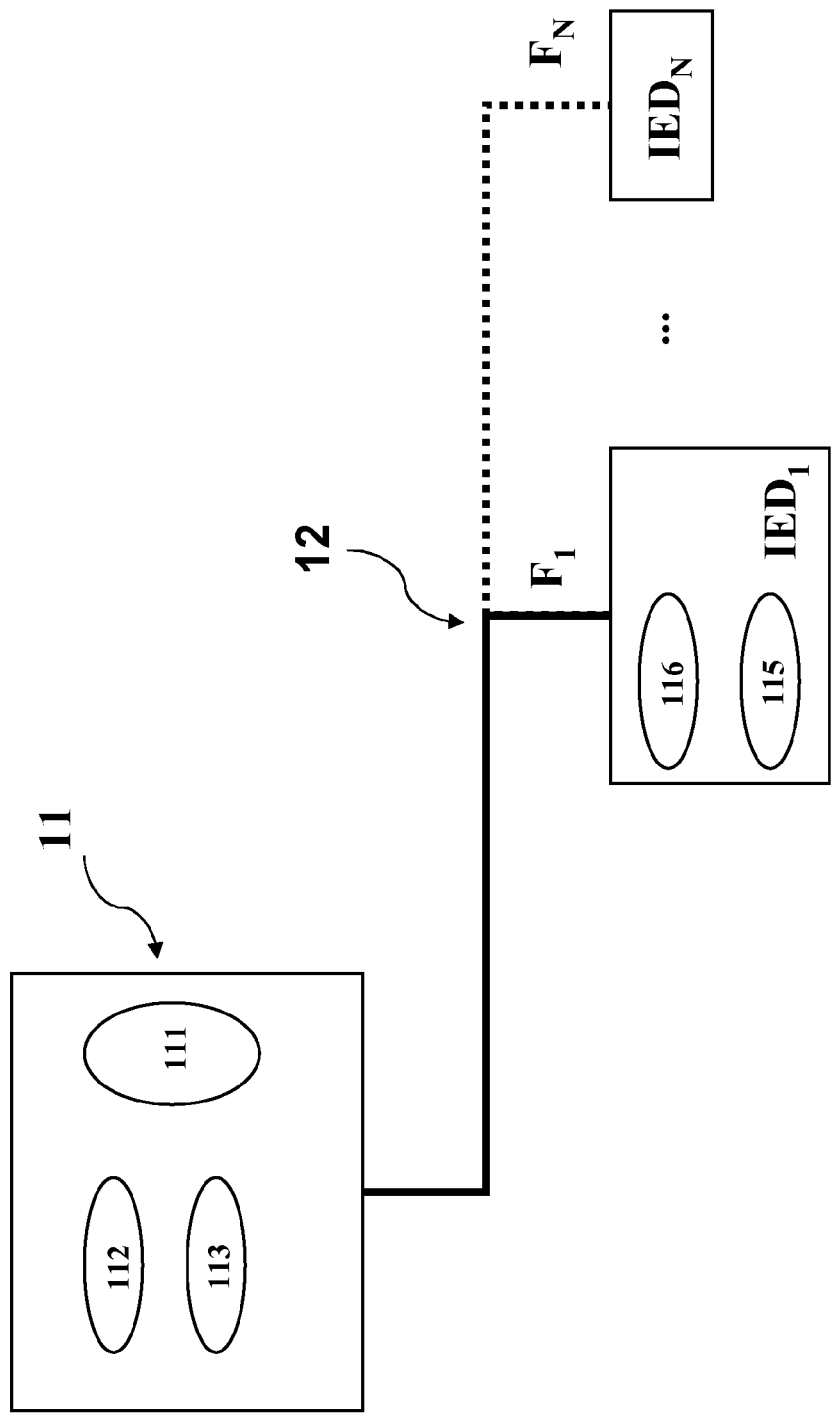

This application is a National Phase filing under 35 U.S.C. §371 of PCT/EP2011/064184 filed on Aug. 17, 2011; and this application claims priority to application Ser. No. 10176966.9 filed in Europe on Sep. 15, 2010 under 35 U.S.C. §119; the entire contents of all are hereby incorporated by reference.

The present invention relates to a low or medium voltage power distribution network. Modern power distribution networks comprise protection and control (P&C) devices, also called Intelligent Electronic Device (IED). Such P&C devices are basically aimed at controlling the operations of the switch devices of the power distribution network, at collecting and providing information related to electrical quantities (voltage, current, power and the like) in certain points of the power distribution network and at implementing high level management functionalities of the power distribution networks.

P&C devices are usually connected to a communication network, e.g. an interbay bus, so that they can communicate and exchange data/information.

A P&C device generally comprises a processing unit, in which a software environment is loaded to support applications for performing the functionalities foreseen for the P&C device. Such a software environment needs to be configured when the P&C is installed. Also, maintenance interventions need to be performed from time to time, in which the software environment of the P&C is re-configured or upgraded to support new or different functionalities of the P&C device.

Upgrading of the software environment of the P&C is generally performed by loading on the P&C device proper configuration files.

Said configuration files are generally downloaded from a service computer that is temporarily connected to the P&C device via a serial cable in one-to-one connection.

As it is largely known, this operation is relatively slow, which fact becomes a relevant disadvantages when a large number of P&C devices need to re-configured as it happens in large power distribution networks.

The practice has shown how installation and maintenance interventions to configure, reconfigure, or upgrade the P&C devices of the network are quite time-spending activities to be carried out.

These problems are worsened by the fact that often P&C devices are installed in locations that are quite difficult to reach. Therefore, it may be difficult for an operator to establish a one-to-one connection with a P&C device, which may bring to a further loss of time or to errors in carrying out the reconfiguration intervention.

Even worse, if an error occurs during the upgrading the old SW is definitively lost and it is needed to repeat the upgrading procedure.

In addition, during the normal software upgrading procedure the P&C device is normally put out of function, with consequent interruption of the service of the network.

It is an object of the present invention to provide a low or medium voltage electric power distribution network that solves the above-mentioned problems.

More in particular, it is an object of the present invention to provide a low or medium voltage electric power distribution network in which the configuration/upgrading of P&C devices can be carried out in safe manner.

A further object of the present invention is to provide a low or medium voltage electric power distribution network in which the maintenance operations of the P&C devices are carried out in a reduced amount of time.

Still a further object of the present invention is to provide a low or medium voltage electric power distribution network in which the maintenance operations of the P&C devices do not require, or minimize, interruption of the operability of the device itself.

Another object of the present invention is to provide a low or medium voltage electric power distribution network in which the amount of maintenance operations work is reduced.

Yet another object of the present invention is to provide a low or medium voltage electric power distribution network, which can be easily managed and maintained and at competitive costs.

The present invention thus relates to a low or medium voltage electric power distribution network comprising:
  at least a P&C device (IED1, IEDN),
  a computer station which communicate with said at least a P&C device through a communication network;
characterised in that said computer station comprises first computerised means for executing, according to a batch processing mode, downloading sessions of software packages (F1, FN) to said P&C devices in order to upgrade the software of said at least a P&C device, said at least a P&C device comprising second computerized means for executing a procedure for safely managing the software upgrade in said at least a P&C device.

In a further aspect, the present invention relates also to a method for performing a software upgrade in at least a P&C device of a low or medium voltage distribution network, said at least a P&C device communicating with a computer station through a communication network, said computer station executing, according to a batch processing mode, downloading sessions of software packages (F1, FN) to said P&C devices in order to upgrade the software of said at least a P&C device, characterised in that it comprises the following steps:
  receiving the software packages downloaded by said computer station; and
  storing the software packages downloaded by said computer station; and
  saving a back-up copy of the old software that is already resident in said at least a P&C device; and
  checking whether the software packages downloaded by said computer station have been correctly stored; and
  if the software packages downloaded by said computer station have not been correctly stored, recovering said back-up copy of the old software, said old software being used to continue the normal operations of said at least a P&C device.

Thanks to the procedure for safely managing the software upgrade in the P&C devices, there is a consistency check between the configuration tool and the device to validate the upgraded software. If the operation fails the mechanism allows to restore the previous software without stopping the normal work.

Preferably, said at least a P&C device comprise third computerized means for storing the software packages downloaded by said computer station and for saving a back-up copy of the old software that is already resident in said at least a P&C device.

In a preferred embodiment of the low or medium voltage distribution network, according to the invention, said procedure comprises the following steps:

checking whether the software packages downloaded by said computer station have been stored by said third computerized means;

if the software packages downloaded by said computer station have been stored, waiting for a message confirming that the software packages downloaded by said computer station have correctly been stored by said third computerized means;

if said message is not received in a predefined period of time, sending instructions to said third computerized means to recover said back-up copy of the old software, said old software being used to continue the normal operations of said at least a P&C device.

Advantageously, said first computerized means execute a plurality of processing threads during a downloading/uploading session of said software packages, each of said processing threads being executed for performing the task of downloading/loading one or more software packages to a selected P&C device in parallel and independent manner with respect to the other P&C devices.

Conveniently, said computer station comprises fourth computerized means for selecting the software packages to be downloaded/uploaded to/from one of said P&C devices.

Also, said computer station can comprise fifth computerized means for performing compatibility checks on the software packages to be downloaded/uploaded to/from one of said P&C devices.

In the low or medium voltage distribution network, according to the invention, each of said software packages (F1, FN) can comprise one or more configuration files.

Said communication network is preferably an Ethernet LAN.

Figure 2:
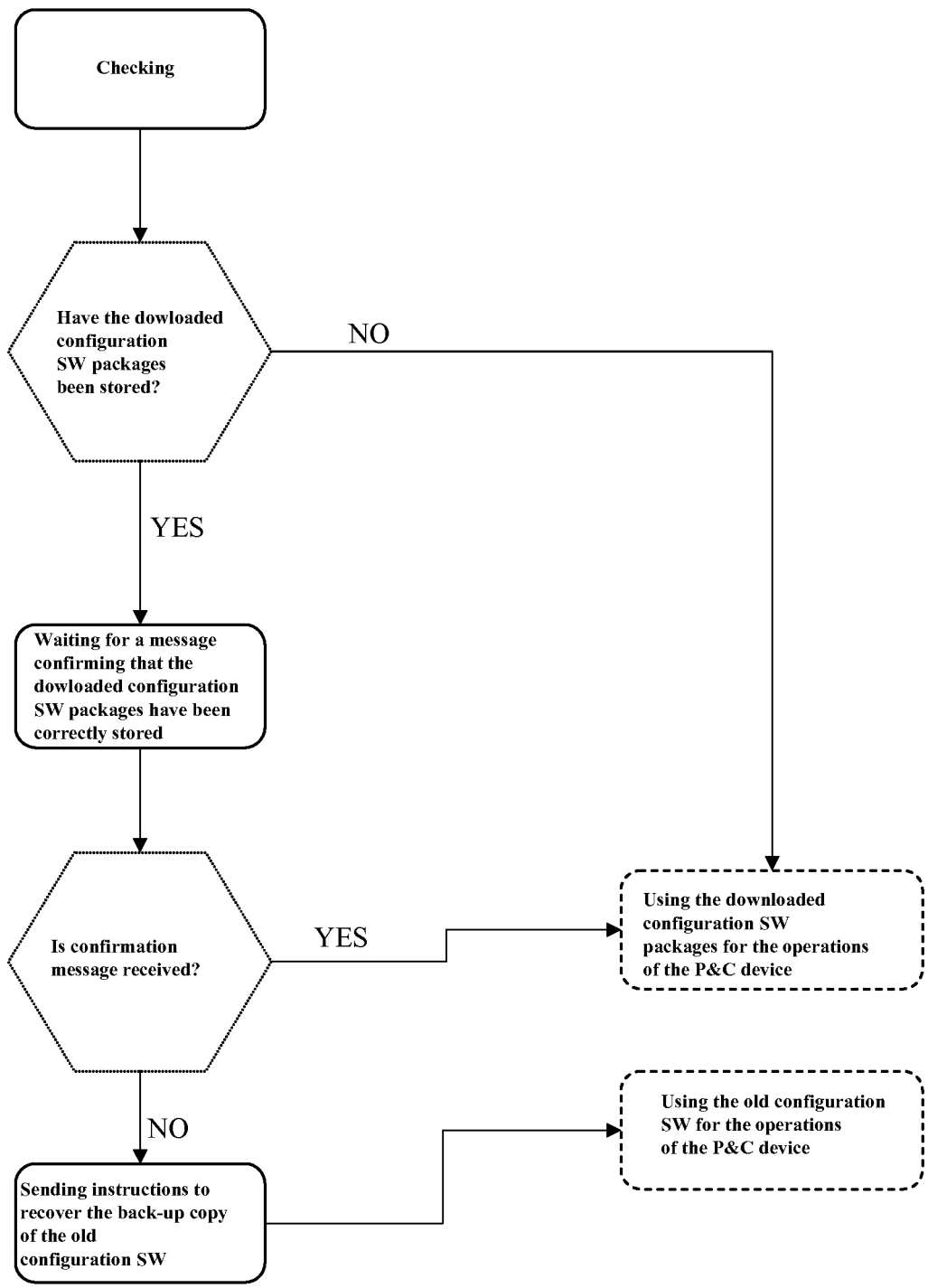
Figure 3:
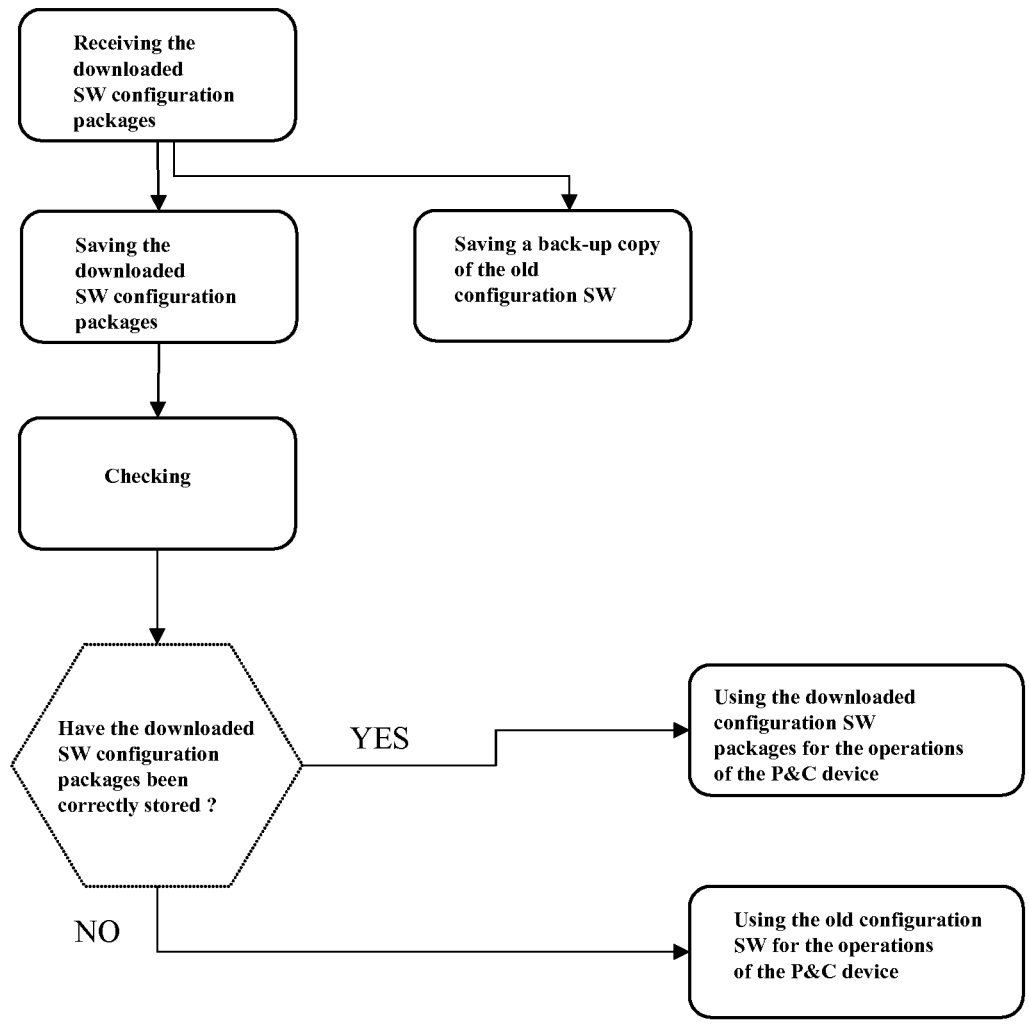

Further characteristics and advantages of the invention will emerge from the description of preferred, but not exclusive, embodiments of the low or medium voltage electric power distribution network, according to the invention, non-limiting examples of which are provided in the attached drawings, wherein:

FIG. 1 is a block scheme of an embodiment of the low or medium voltage electric power distribution network, according to the invention; and FIG. 2 is a scheme of a first embodiment of executing the procedure for safely managing the software upgrade, according to the invention; and FIG. 3 is a scheme of a second embodiment of executing the procedure for safely managing the software upgrade, according to the invention.

Referring to FIG. 1, a low or medium voltage electric power distribution network comprises, in its more general definition, at least a P&C device (IED1, IEDN). As already said, P&C devices are basically aimed at performing a number of functions such as: controlling the operations of the switch devices of the power distribution network, collecting and providing information related to electrical quantities (voltage, current, and the like) in certain points of the power distribution network, and implementing high level management functionalities of the power distribution networks. P&C devices are well known in the art and will not be described in further details.

The low or medium voltage electric power distribution network of the invention further comprises a computerized station 11 which can communicate with said P&C devices through a communication network 12, which is preferably an Ethernet LAN.

One of the characterizing features of the low or medium voltage electric power distribution network of the invention is that said computer station 11 comprises first computerized means 111 for executing, according to a batch processing mode, downloading sessions of software packages (F1, FN) to said P&C devices in order to upgrade the software of said at least a P&C device.

Furthermore, said at least a P&C device comprises second computerized means 115 for executing a procedure for safely managing the software upgrade in said at least a P&C device. Preferably, said at least a P&C device comprise third computerized means 116 for storing the software packages downloaded by said computer station and for saving a back-up copy of the old software that is already resident in said at least a P&C device.

With reference to FIG. 2, in practice the procedure for safely managing preferably comprises a check step to check whether the software packages downloaded by said computer station 11 have been stored by said third computerized means 116. If the software packages downloaded by said computer station 11 have been stored by said third computerized means 116, the downloaded software packages are used for the operations of the P&C device. Conversely, if the software packages downloaded by said computer station 11 have not been correctly stored by said third computerized means 116, the old software is used for the operations of the P&C device.

With reference to FIG. 3, the procedure for safely managing preferably comprises the following steps:

checking whether the software packages downloaded by said computer station 11 have been stored by said third computerized means 116;

if the software packages downloaded by said computer station 11 have been stored, waiting for a message confirming that the software packages downloaded by said computer station 11 have correctly been stored by said third computerized means 116;

if said message is not received in a predefined period of time, sending instructions to said third computerized means 116 to recover said back-up copy of the old software, said old software being used to continue the normal operations of said at least a P&C device.

In practice, the core of the invention is to provide a safety mechanism for the batch upgrading of the software of many devices in a communication network 12, such as TCP/IP network. For the purposes of the present invention, batch upgrading is a form of batch processing used to send software to multiple devices in an automated fashion, in order to save time and reduce the amount of work involved.

The first phase of the download sequence is completely controlled by the service operator through a Configuration Tool of the computerized station 11, e.g. a maintenance PC.

After the selection of the software file to be downloaded the Configuration Tool performs some compatibility checks. If everything works properly the download phase can start. The download phase preferably adopts the session model concept (open a session—download software—close session) to prevent multiple contemporaneous software download from different PCs. This mechanism guarantees that the IED can continue to be "alive" while downloading the software and continue to perform normal operations of protection and control.

Once the IED receives the upgraded software file the storing procedure can start. At the start-up, in case the software is stored the IED waits for a confirmation message.

If the confirmation message is not received within a predefined timeout, the old software is recovered by the boot loader. The old software is saved in a back-up FLASH block. This allows recovering the old software in case of sudden power-fail while storing new software or in case the new software is not working.

Instead if the confirmation message is received, the IED goes in the normal operation way and checks if a new session is opened. If it is opened, it receives the software and close the session, starting the storing through the boot loader. The boot loader saves the old software and stores the new one.

The IED will be "dead" only while storing the upgraded software (about 1 min.) in which period it doesn't work in normal condition. Thus, the out of function time of the device is considerably reduced with respect to the known procedures.

Preferably, said first computerized means 11 execute a plurality of processing threads during a downloading/uploading session of said software packages, each of said processing threads being executed for performing the task of downloading/loading one or more software packages to a selected P&C device in parallel and independent manner with respect to the other P&C devices.

In practice, this solution is achieved implementing in computer station 11 (e.g. a maintenance PC) a multi-threading architecture in order to support many threads each running at the same time within the program and running simultaneously.

In particular there is one thread for each IED (IED1, IEDN) in the network with the job to perform the unique task of sending software to its relevant IED (IED1, IEDN).

Conveniently, the computer station 11 before starting to send the software file knows all the IP addresses assigned to IEDs. Then, the operator selects the software file and starts the sending session.

The main flow of process creates for each IED (IED1, IEDN) a thread that is responsible to send the software file to its correspondent IED. This operation is made in parallel for all the devices independently each one to other.

When a thread ends its work then it sends a message to the main flow process to signal the operation result. Then, the main flow ends the whole operation when all the threads have finished their session download.

Finally, the result is shown to the operator for each IED. Conveniently, the whole operation can be showed to the operator by means of a progress bar during the sending session and the result by means of status message for each IED.

Thus, in the adopted model multiple threads can exist within the context of the single main process. These threads are able to execute independently sharing only the resources of the main process. The main execution flow and threads communicate through standard messages. In order to carry out the above, said computerized station 11 preferably comprises fourth computerized means 112 for selecting the software upgrading data packages to be downloaded to one of said P&C devices.

According to a further preferred embodiment of a low or medium voltage distribution network of the invention, said computerized station 11 conveniently comprises fifth computerized means 113 for performing compatibility checks on the upgrading data packages to be downloaded to one of said P&C devices.

The method for performing a software upgrade in at least a P&C device of a low or medium voltage distribution network, according to the invention, comprises therefore the following steps:
  receiving the software packages downloaded by said computer station 11; and
  storing the software packages downloaded by said computer station 11; and
  saving a back-up copy of the old software that is already resident in said at least a P&C device; and
  checking whether the software packages downloaded by said computer station 11 have been correctly stored; and
  if the software packages downloaded by said computer station have not been correctly stored, recovering said back-up copy of the old software, said old software being used to continue the normal operations of said at least a P&C device.

Preferably, if the software packages downloaded by said computer station 11 have been stored, the method comprises the step of waiting for a message confirming that the software packages downloaded by said computer station 11 have correctly been stored. If said message is not received in a predefined period of time, sending instructions to recover said back-up copy of the old software, said old software being used to continue the normal operations of said at least a P&C device.

As it can be appreciated from the above description and the cited figures, in the low or medium voltage distribution network of the invention, thanks to the procedure for safely managing the software upgrade in the P&C devices, if an error occurs during the upgrading the old SW nothing is lost and there is possible to repeat the upgrading procedure. Moreover, since the P&C device is kept running during the downloading procedure, the out of service time of the P&C device itself is greatly minimized.

Also, the multi-threading architecture allows to execute a plurality of processing threads during the downloading sessions of the software upgrading data packages, thereby achieving considerable time saving during maintenance operations.

The low or medium voltage distribution network thus conceived may undergo numerous modifications and come in several variants, all coming within the scope of the inventive concept. Moreover, all the component parts described herein may be substituted by other, technically equivalent elements. In practice, the component materials and dimensions of the device may be of any nature, according to need and the state of the art.

The invention claimed is:

1. A low or medium voltage electric power distribution network comprising:
  at least a protection and control ("P&C") device ($IED_1$, $IED_N$) configured to control switches of the power distribution network,
  a computer station which communicate with said at least a P&C device through a communication network;
  wherein said computer station comprises first computerised means for executing, according to a batch processing mode, downloading sessions of software packages ($F_1$, $F_N$) to said P&C devices in order to upgrade the software of said at least a P&C device;
  wherein said at least a P&C device comprises second computerized means for executing a procedure for safely managing software upgrade to upgraded software in said at least a P&C device and third computerized means for storing the software packages downloaded by said computer station and for saving a back-up copy of old software to be updated that is already resident in said at least a P&C device;
  wherein the said second computerized means is configured to execute the procedure as comprises the following:
  checking whether the software packages downloaded by said computer station have been correctly stored, comprising a consistency check between a configuration tool of the computer station and said at least a P&C device being performed to validate the upgraded software;

waiting for confirmation that the software packages downloaded by said computer station have been stored correctly;

when said confirmation is not received in a predefined period of time, sending instructions to recover said back-up copy of the old software, said back-up copy of the old software being used to continue the normal operations of said at least a P&C device.

2. A low or medium voltage distribution network, according to claim 1, characterized in that said at least a P&C device comprise third computerised means for storing the software packages downloaded by said computer station and for saving a back-up copy of the old software that is already resident in said at least a P&C device.

3. A low or medium voltage distribution network, according to claim 1, wherein said first computerised means execute a plurality of processing threads during a downloading/uploading session of said software packages, each of said processing threads being executed for performing the task of downloading one software package to the selected P&C devices in parallel and independent manner with respect to the other P&C devices.

4. A low or medium voltage distribution network, according claim 1, wherein said computer station comprises fourth computerised means for selecting the software package to be downloaded to the selected P&C devices.

5. A low or medium voltage distribution network, according to claim 1, wherein said computer station comprises fifth computerised means for performing compatibility checks on the software packages to be downloaded to one of said P&C devices.

6. A low or medium voltage distribution network, according to claim 1, wherein each of said software packages ($F_1$, $F_N$) comprises one software file.

7. A low or medium voltage distribution network, according to claim 1, wherein said communication network is a an Ethernet LAN.

8. A method for performing a software upgrade in at least a protection and control ("P&C device") configured to control switches of a low or medium voltage distribution network, said at least a P&C device communicating with a computer station through a communication network, said computer station executing, according to a batch processing mode, downloading sessions of software packages ($F_1$, $F_N$) to said P&C devices in order to upgrade the software of said at least a P&C device, wherein it comprises the following steps:

receiving the software package downloaded by said computer station; and storing the software package downloaded by said computer station; and saving a back-up copy of the old software that is already resident in said at least a P&C device; and checking whether the software package downloaded by said computer station have been correctly stored comprising a consistency check between a configuration tool of the computer station and said at least a P&C device being performed to validate the upgraded software;

waiting for confirmation that the software packages downloaded by said computer station have been stored correctly; and when the software package downloaded by said computer station have not been correctly stored, recovering said back-up copy of the old software, said old software being used to continue the normal operations of said at least a P&C device.

9. The method according to claim 8 wherein, if the software packages downloaded by said computer station have been stored, it comprises the step of waiting for a message confirming that the software packages downloaded by said computer station have correctly been stored, and, if said message is not received in a predefined period of time, sending instructions to recover said back-up copy of the old software, said old software being used to continue the normal operations of said at least a P&C device.

10. A low or medium voltage distribution network, according to claim 2, wherein said first computerised means execute a plurality of processing threads during a downloading/uploading session of said software packages, each of said processing threads being executed for performing the task of downloading one software package to the selected P&C devices in parallel and independent manner with respect to the other P&C devices.

11. A low or medium voltage distribution network, according to claim 1, wherein said first computerised means execute a plurality of processing threads during a downloading/uploading session of said software packages, each of said processing threads being executed for performing the task of downloading one software package to the selected P&C devices in parallel and independent manner with respect to the other P&C devices.

12. A low or medium voltage distribution network, according to claim 2, wherein said computer station comprises fourth computerised means for selecting the software package to be downloaded to the selected P&C devices.

13. A low or medium voltage distribution network, according to claim 5, wherein said computer station comprises fourth computerised means for selecting the software package to be downloaded to the selected P&C devices.

14. A low or medium voltage distribution network, according to claim 3, wherein said computer station comprises fourth computerised means for selecting the software package to be downloaded to the selected P&C devices.

15. A low or medium voltage distribution network, according to claim 2, wherein said computer station comprises fifth computerised means for performing compatibility checks on the software packages to be downloaded to one of said P&C devices.

16. A low or medium voltage distribution network, according to claim 1, wherein said computer station comprises fifth computerised means for performing compatibility checks on the software packages to be downloaded to one of said P&C devices.

17. A low or medium voltage distribution network, according to claim 3, wherein said computer station comprises fifth computerised means for performing compatibility checks on the software packages to be downloaded to one of said P&C devices.

18. A low or medium voltage distribution network, according to claim 2, wherein said computer station comprises fifth computerised means for performing compatibility checks on the software packages to be downloaded to one of said P&C devices.

* * * * *